United States Patent
Klein et al.

(10) Patent No.: US 11,637,873 B2
(45) Date of Patent: Apr. 25, 2023

(54) METHOD AND APPARATUS FOR MANAGING COMMUNICATION RESOURCES

(71) Applicant: AT&T Intellectual Property I, LP, Atlanta, GA (US)

(72) Inventors: Reuben Klein, East Brunswick, NJ (US); Richard Lynn Bennett, Spring Lake, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 415 days.

(21) Appl. No.: 14/621,514

(22) Filed: Feb. 13, 2015

(65) Prior Publication Data

US 2016/0241604 A1  Aug. 18, 2016

(51) Int. Cl.
*H04L 65/1069* (2022.01)
*H04L 65/403* (2022.01)
*H04L 47/70* (2022.01)

(52) U.S. Cl.
CPC .......... *H04L 65/1069* (2013.01); *H04L 47/70* (2013.01); *H04L 65/403* (2013.01)

(58) Field of Classification Search
CPC .... H04L 65/1069; H04L 65/403; H04L 47/70
USPC ....................................................... 709/204
See application file for complete search history.

(56) References Cited

U.S. PATENT DOCUMENTS

| | | | |
|---|---|---|---|
| 7,296,089 B2* | 11/2007 | Krishnamurthy | H04L 29/06 709/238 |
| 7,461,126 B2 | 12/2008 | Berkeland et al. | |
| 7,730,411 B2 | 6/2010 | Chotai | |
| 7,783,704 B2 | 8/2010 | Acharya et al. | |
| 8,112,490 B2 | 2/2012 | Upton et al. | |
| 8,266,209 B2 | 9/2012 | Pegg et al. | |
| 8,407,288 B2 | 3/2013 | Thapa | |
| 8,675,853 B1* | 3/2014 | Guilfoyle | H04M 3/2227 379/202.01 |
| 8,717,401 B1* | 5/2014 | Gossweiler, III | H04L 12/1818 348/14.01 |
| 9,432,478 B2* | 8/2016 | Gibbon | H04L 65/80 |
| 2001/0005382 A1* | 6/2001 | Cave | H04L 65/4007 370/466 |
| 2001/0054070 A1 | 12/2001 | Savage, III et al. | |
| 2003/0148785 A1* | 8/2003 | Mangal | H04W 68/00 455/552.1 |

(Continued)

OTHER PUBLICATIONS

Knauf, Alexander et al., "A virtual and distributed control layer with proximity awareness for group conferencing in P2PSIP", Principles, Systems and Applications of IP Telecommunications. ACM, 2010.

*Primary Examiner* — Jerry B Dennison
(74) *Attorney, Agent, or Firm* — Guntin & Gust, PLC; Ralph Trementozzi

(57) ABSTRACT

Aspects of the subject disclosure may include, for example, a device that performs operations including receiving a request for a communication session, determining participants of the communication session, determining a location of each participant of the communication session, selecting a virtual media server from among a group of media servers according to a location that reduces a communication path among the participants for the communication session, instantiating the virtual media server at a start time of the communication session, grouping the participants of the communication session into end points, and relaying communication session data between the end points. Other embodiments are disclosed.

20 Claims, 12 Drawing Sheets

(56) References Cited

U.S. PATENT DOCUMENTS

| | | | |
|---|---|---|---|
| 2004/0003046 A1* | 1/2004 | Grabelsky | H04L 65/608 709/206 |
| 2005/0114478 A1* | 5/2005 | Popescu | H04L 12/185 709/220 |
| 2008/0063173 A1* | 3/2008 | Sarkar | H04M 3/56 379/202.01 |
| 2008/0095079 A1 | 4/2008 | Barkley et al. | |
| 2008/0120370 A1 | 5/2008 | Chan et al. | |
| 2010/0325209 A1* | 12/2010 | Thapa | H04L 45/00 709/204 |
| 2012/0047270 A1* | 2/2012 | Chandrasekaran | H04L 41/12 709/227 |
| 2012/0290643 A1* | 11/2012 | Fok Ah Chuen | H04L 67/1021 709/203 |
| 2012/0297405 A1* | 11/2012 | Zhang | H04H 20/08 725/9 |
| 2013/0258043 A1 | 10/2013 | Amano | |
| 2014/0019970 A1* | 1/2014 | Okamoto | G06F 9/4856 718/1 |
| 2014/0049594 A1 | 2/2014 | Davis | |
| 2014/0085406 A1 | 3/2014 | Narayanan | |
| 2014/0199959 A1* | 7/2014 | Hassan | G01S 5/0205 455/404.2 |
| 2015/0181165 A1* | 6/2015 | Iltus | H04N 7/15 348/14.09 |
| 2016/0080445 A1* | 3/2016 | Kazerani | H04L 65/4076 709/219 |
| 2016/0205519 A1* | 7/2016 | Patel | H04L 41/5041 455/518 |
| 2016/0352790 A1* | 12/2016 | Hollingsworth | H04L 67/18 |

* cited by examiner

400

METHOD AND APPARATUS FOR MANAGING COMMUNICATION RESOURCES

FIELD OF THE DISCLOSURE

The subject disclosure relates to a method and apparatus for managing communication resources.

BACKGROUND

Wireline and wireless communication networks provide end users a diverse choice of communication services such as streaming content, voice communications, video communications, Internet access, and so on. Such networks generally provide communication services to end users in diverse geographic locations. As the demand for communication services grows, service providers of the communication networks must find ways to deploy network resources efficiently.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for controlling a media server to provide a communication session between participants. Other embodiments are described in the subject disclosure.

One embodiment of the subject disclosure includes receiving, by a system comprising a processor, a request for a communication session, determining, by the system, participants of the communication session, determining, by the system, a location of each participant of the communication session, and selecting a virtual media server from among a group of media servers according to a location that reduces a communication path among the participants for the communication session. The embodiment can also include instantiating, by the system, the virtual media server at the beginning of the communication session and grouping, by the system, the participants of the communication session into end points and then relaying, by the system, communication session data between the end points.

One embodiment of the subject disclosure includes determining participants of the communication session, grouping the participants of the communication session into end points. The embodiment also includes selecting a virtual media server from among a group of media servers according to the end points to reduce a communication path among the participants for the communication session. In addition, the embodiment includes instantiating the virtual media server at a beginning of the communication session, relaying communication session data between the end points during the communication session, and deleting the virtual media server at an end of the communication session.

One embodiment of the subject disclosure includes determining participants of the communication session and grouping the participants of the communication session into end point locations, wherein the locations comprise points in the network in close proximity to at least a portion of the participants. The embodiment further includes instantiating a virtual media server at a start event of the communication session to reduce a communication path between the end points for the communication session and relaying communication session data between the end point locations.

Figure 1A:
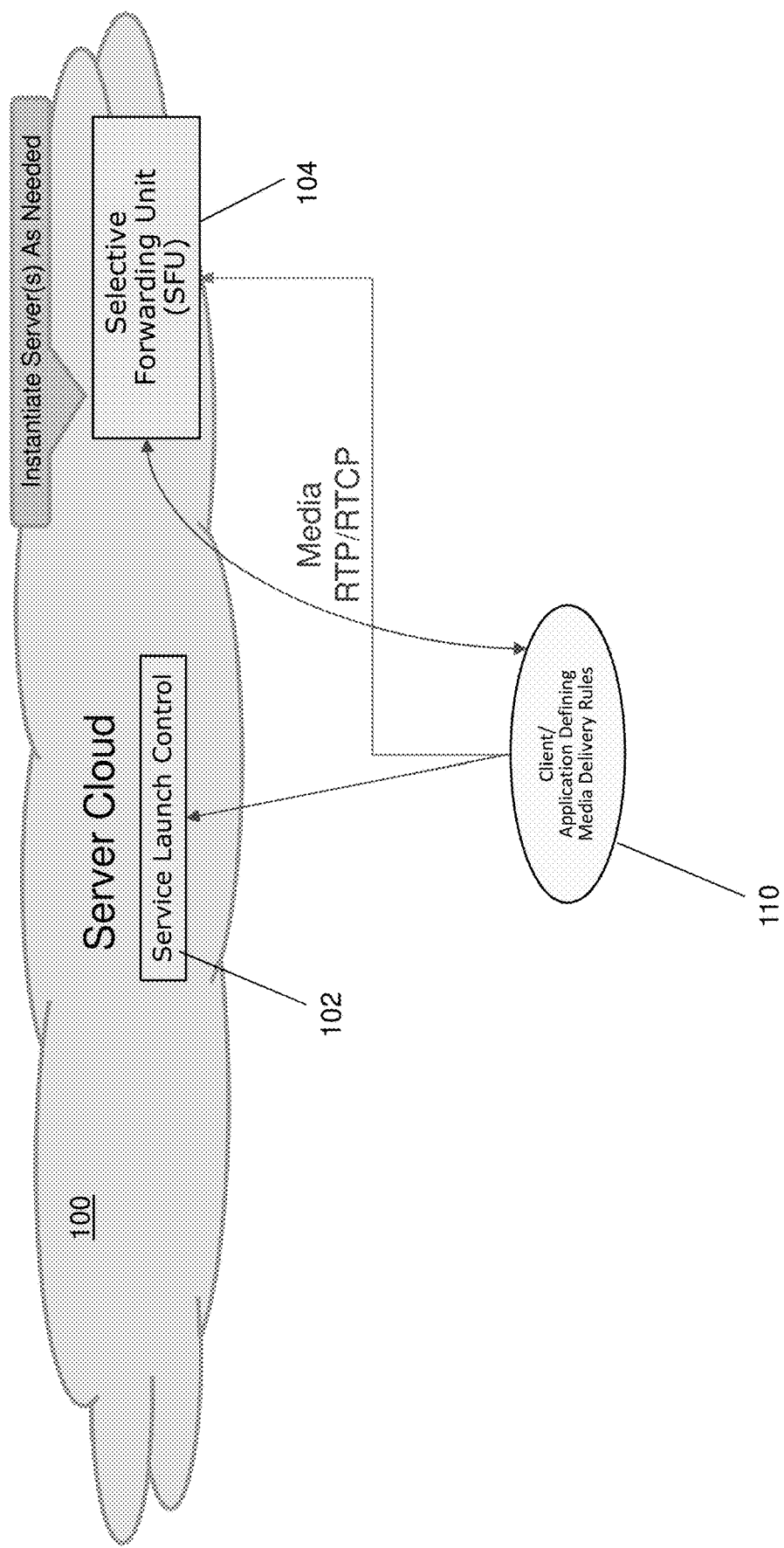
FIGS. 1A, 1B and 1C depict illustrative embodiments of a communication system for managing communication resources.
Figure 1B:
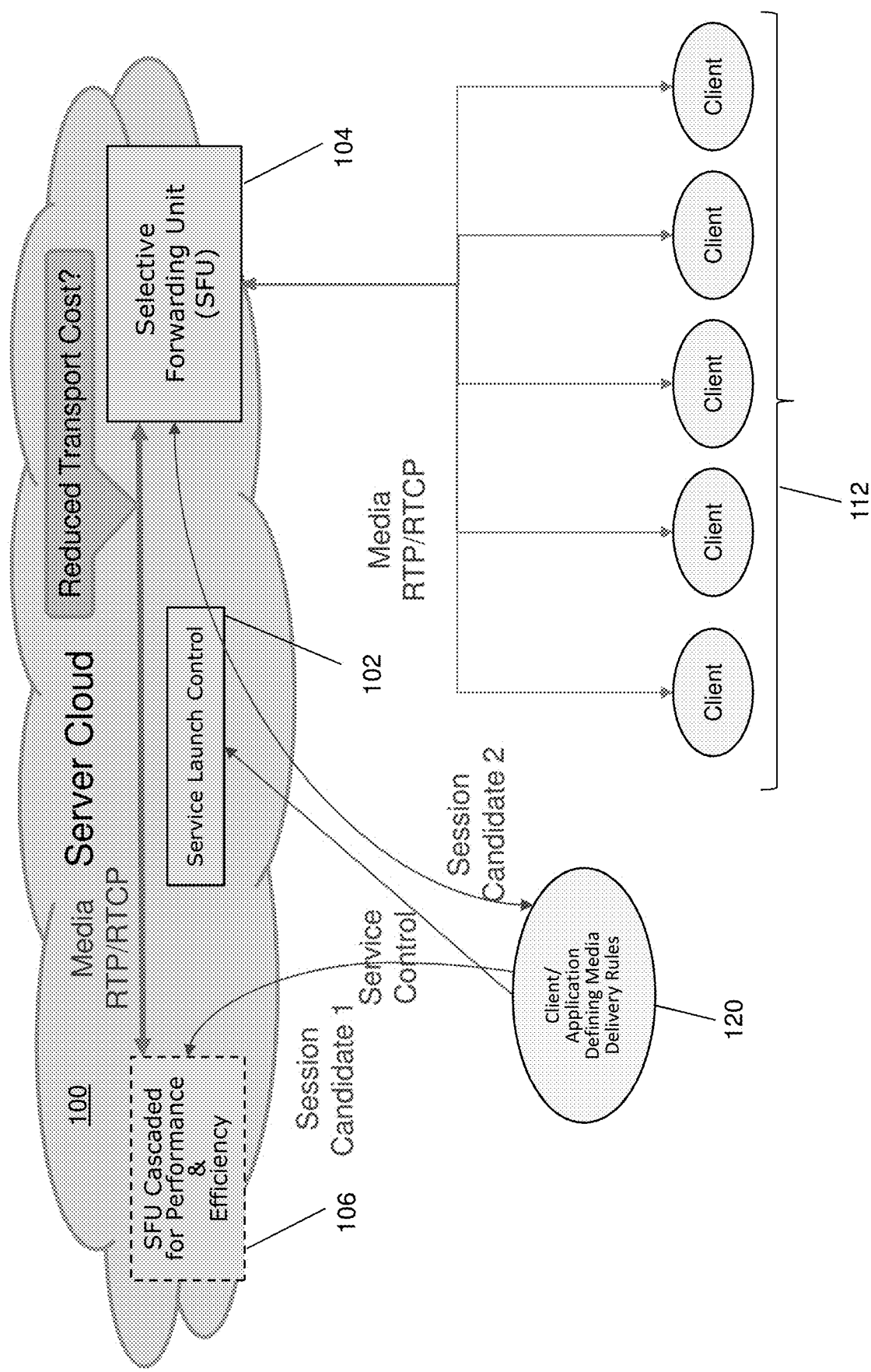
Figure 1C:
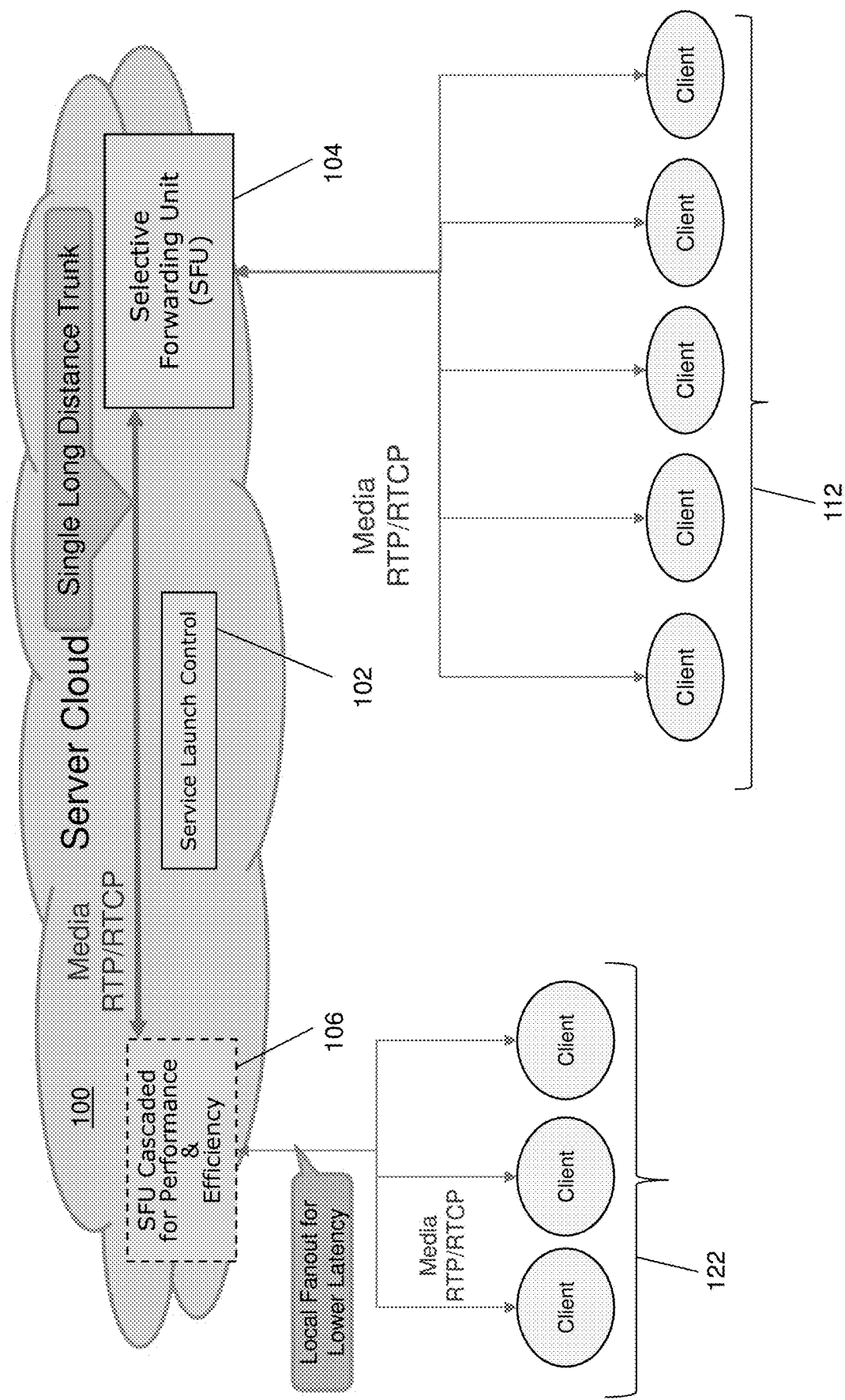

FIGS. 1A, 1B, and 1C depict illustrative embodiments of a communication system 100 for managing communication resources. Communication system 100 can comprise a server network or a server cloud (herein referred to as server cloud 100), the server network can be controlled by a service launch controller 102. The service launch controller 102 can comprise centralized (or decentralized) computing and communication resources (e.g., server(s), router(s), switches, etc.) to manage hardware resources of the server cloud 100. The hardware resources of the server cloud 100 can be vast, including but not limited to, communication resources (e.g., switches, routers, etc.) and computing resources (e.g., servers, storage devices, etc.) which can be customized to generate one or more instances of a virtual machine that performs certain functions based on software applications installed on the virtual machine by the service launch controller 102. The applications can be an operating system and/or specialized software applications executed by the operating system.

In one embodiment, hardware resources of the server cloud 100 can be controlled by a hypervisor that enables the service launch controller 102 to launch one or more virtual machines that utilize portions of the hardware resources of the server cloud 100. In one embodiment, the service launch controller 102 can install software applications in each of the virtual machines after they are launched. In another embodiment, the hypervisor can launch pre-configured virtual machines, which are launched with pre-installed software applications that perform desired function(s). With a server cloud 100 architecture, the service launch controller 102 can launch multiple virtual machines that can provide services to requesting client devices on an on-demand basis. When the client devices no longer require such services, the virtual machines linked to these services can be removed (torn down) to free up the hardware resources of the server cloud 100. The launching and removal of virtual machines can be fully automated so that service personnel need not be involved or are minimally involved. It should be noted that the service launch controller 102 can itself be one or more instantiations of virtual machines which serve to launch and tear down virtual machines in the server cloud 100 on behalf of client devices.

Referring back to the illustration of FIG. 1A, the service launch controller 102 can be adapted to receive a request from a client device 110 (e.g., a computer, a smartphone, a tablet, a server, etc.) for media services (e.g., a teleconferencing service, media streaming services, etc.). The client device 110 can provide rules, codes, instructions, and/or other informative information to the service launch controller 102 to describe the services requested. The service launch controller 102 can process this information and thereby launch one or more instances of a virtual machine (depicted as a "selective forwarding unit 104") configured to provide the client device 110 the services requested over a real-time transport protocol (RTP) for carrying media streams in conjunction with an RTP control protocol (RTCP) for monitoring traffic statistics, quality of service (QoS), and for aiding in synchronization of multiple media streams. It is noted that other transport and control protocols can be used in accordance with the embodiments of the subject disclosure.

To make the most efficient use of hardware resources and to provide services to the client device 110 with reduced latency, reduced jitter, reduced packet losses, and a desired QoS, the service launch controller 102 can be configured to obtain location information of the requesting client device 110 by sending message pings to the client device 110 that measure a roundtrip delay, requesting location coordinates from the requesting client device 110, obtaining an IP address of the client device 110, or by obtaining other location data that enables the service launch controller 102 to locate hardware resources in the server cloud 100 in proximity to the requesting client device 110. When hardware resources in proximity to the requesting client device 110 are identified, the service launch controller 102 can perform testing to determine if such resources can provide the requesting client device 110 a desirable QoS to the client device 110. If so, a selective forwarding unit 104 is launched. Otherwise, other resources in the server cloud 100 (at perhaps a different location) can be identified by the service launch controller 102 and QoS testing can be performed to verify that these resources can provide adequate services to the requesting client device 110.

Once the selective forwarding unit 104 has been launched, the requested services can be provided to the client device 110. Depending on the resources of the selective forwarding unit 104, additional client devices in a vicinity of the requesting client device can also be served by the selective forwarding unit 104 as depicted in FIG. 1B by reference 112. If additional resources are required to service more than one client device, the service launch controller 102 can direct a hypervisor managing the resources of the selective forwarding unit 104 to augment resources of the selective forwarding unit 104 with additional CPUs, additional memory, additional routers, switches, etc.

FIG. 1B further depicts a geographically disperse client device 120 (e.g., located in New York, while client devices 112 are located in California) requesting services from the service launch controller 102. The request sent to the service launch controller 102 can include rules, codes, instructions, and/or other informative information to describe the services requested. Suppose in this illustration that the client device 120 is requesting media services for itself ("session candidate 1"). The service launch controller 102 can determine the location of the client device 120 as described earlier and thereby identify hardware resources of the server cloud 100 to launch a virtual machine configured to provide media services (e.g., video on demand, streaming content, etc.) consistent with the demands of session candidate 1.

Suppose instead that the client device 120 is requesting a communication session (e.g., video teleconferencing) with the client devices 112 ("session candidate 2"). Based on this request, the service launch controller 102 can determine the location of the client device 120 as described earlier and thereby identify hardware resources of the server cloud 100 to launch a virtual machine to enable teleconferencing with the client devices 112 over an RTP/RTCP connection. To enable cost effective communications over long disparate geographic locations, the service launch controller 102 can facilitate the establishment of a communications trunk (RTP/RTCP) between the selective forwarding units 106 and 104. The trunk can be a one-time trunk that is established while the teleconference services are active and torn down when services are terminated by client devices 112 and/or 120. FIG. 1C illustrates a scenario where additional clients are added to the selective forwarding unit 106. Similar to the description earlier for the selective forwarding unit 104, the resources of the selective forwarding unit 106 can be adapted by the service launch controller 102 to provide services to additional client devices 122.

Figure 2A:
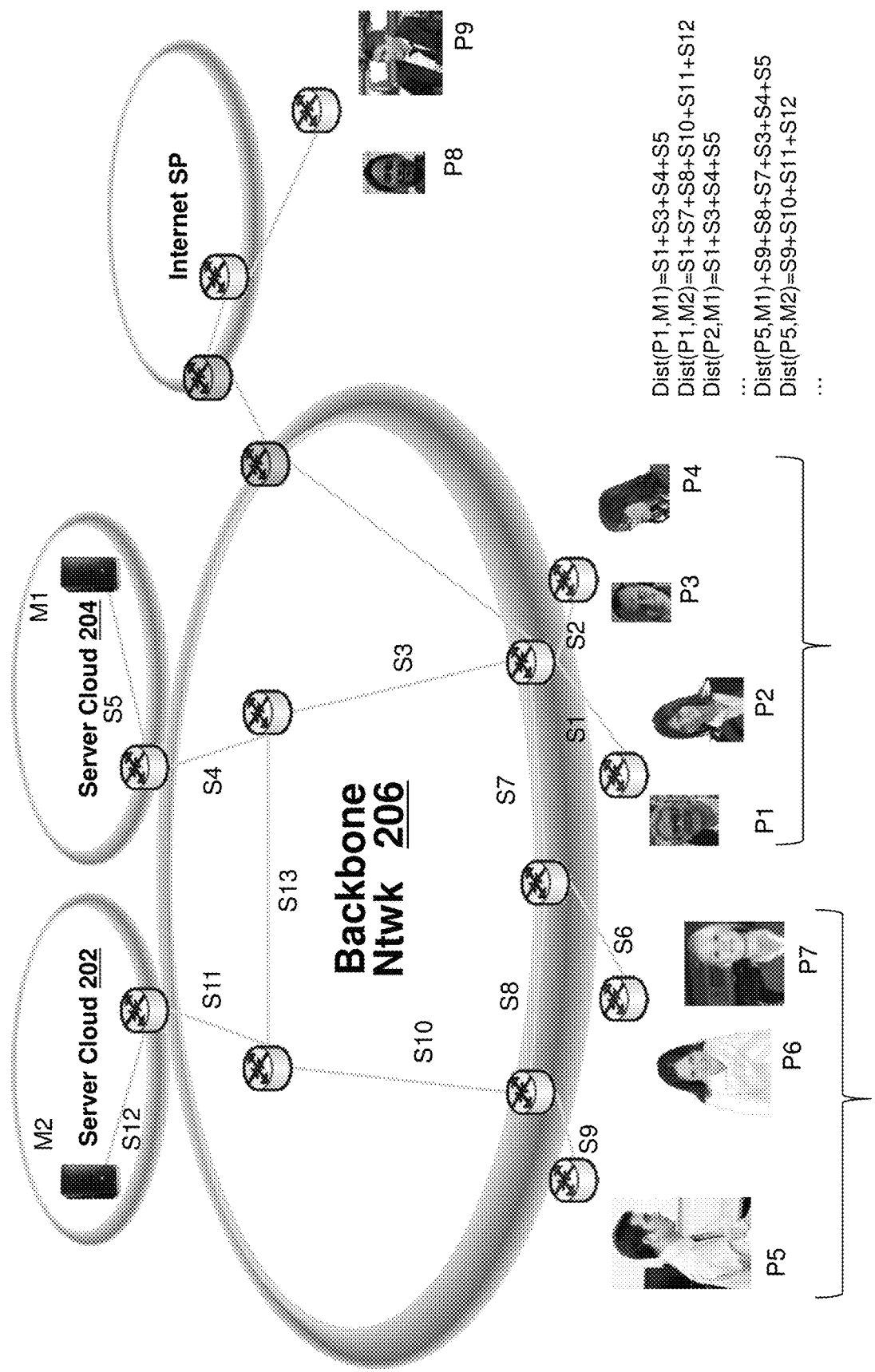
FIGS. 2A, 2B, 2C, 2D, 2E and 2F depict illustrative embodiments for managing resources of a communication system in accordance with the embodiments of the subject disclosure.

FIGS. 2A, 2B, 2C, 2D, 2E, and 2F depict illustrative embodiments for managing resources of a communication system 200 in accordance with the embodiments of the subject disclosure. FIG. 2A depicts a communication system 200 comprising a backbone network 206 of routers and switches interconnected with server cloud networks 202 and 204 located at different geographic locations in the backbone network 206. The backbone network 206 can be connected to client devices of a number of participants (P1-P7). Participants P1-P4 can be located in one geographic location (e.g., California), while participants P5-P7 can be located at a different geographic location (e.g., New York). The server cloud networks 202 and 204 can each provide client devices of the participants P1-P7 access to virtual media servers M1 and M2, respectively.

In the illustration of FIG. 2A, the client devices of participants P1-P4 can receive better services when accessing the media services of the virtual media server M1 than virtual media server M2. This is because the M1 server can provide the least number of router/switch hops (S1+S3+S4+S5) for the client devices of P1-P2 as noted by the distance formulas shown. The M1 server can also provide the least number of router/switch hops (S2+S3+S4+S5) for the client devices of P3-P4. Similarly, the client device of P5-P7 would experience the least router hops when utilizing the media services of the virtual media server M2. For example, the M1 server would provide the least number of router/switch hops (S9+S10+S11+S12) for the client device of P5 as noted by the distance formula shown. Similar observations can be made of client devices for P6-P7.

The service launch controller 102 can be configured to selectively launch virtual media server(s) dynamically at server clouds 202 and 204 in accordance with the embodiments described in FIGS. 1A-1C. In one embodiment, the service launch controller 102 can identify hardware resources of server clouds 202 and 204 by clustering the delay values, $D(P_n)$, to thereby select the resources for one or more virtual media servers (such as the SFUs of FIGS. 1A-1C). In one embodiment, the service launch controller 102 can determine delay values $D(P_n)$ by determining a number of router/switch hops, performing latency measurements, performing packet loss measurements at each router/switch, performing bit rate errors measurements at each router/switch, or any combination thereof, according to a location of each client device of the participants. Other traffic parameters may be used to calculate delay values $D(P_n)$ for client devices.

In one embodiment, the service launch controller 102 can be configured to select client devices so that the sum of the delays from media server M1 to a cluster of participants is minimized, and similarly the sum of the delays from media server M2 to a cluster of participants is also minimized. In one embodiment, the effective proximity of client devices can be determined by measuring a delay $D(P_n)$ of media flow for each client device of the participants and by minimizing the sum of delays of the client devices. In one embodiment, the service launch controller 102 can be configured to determine a minimized delay for client devices (P$_1$-P$_7$) based on a formulation such as, min($\Sigma_{n=1}^{7}$D (P$_n$). Based on any combination of the foregoing determinations, the service launch controller 102 can conclude that the cluster of participants P1-P4 to M1 provides a minimized delay, and the cluster of participants P5-P7 to M2 also provides a minimized delay.

Figure 2B:
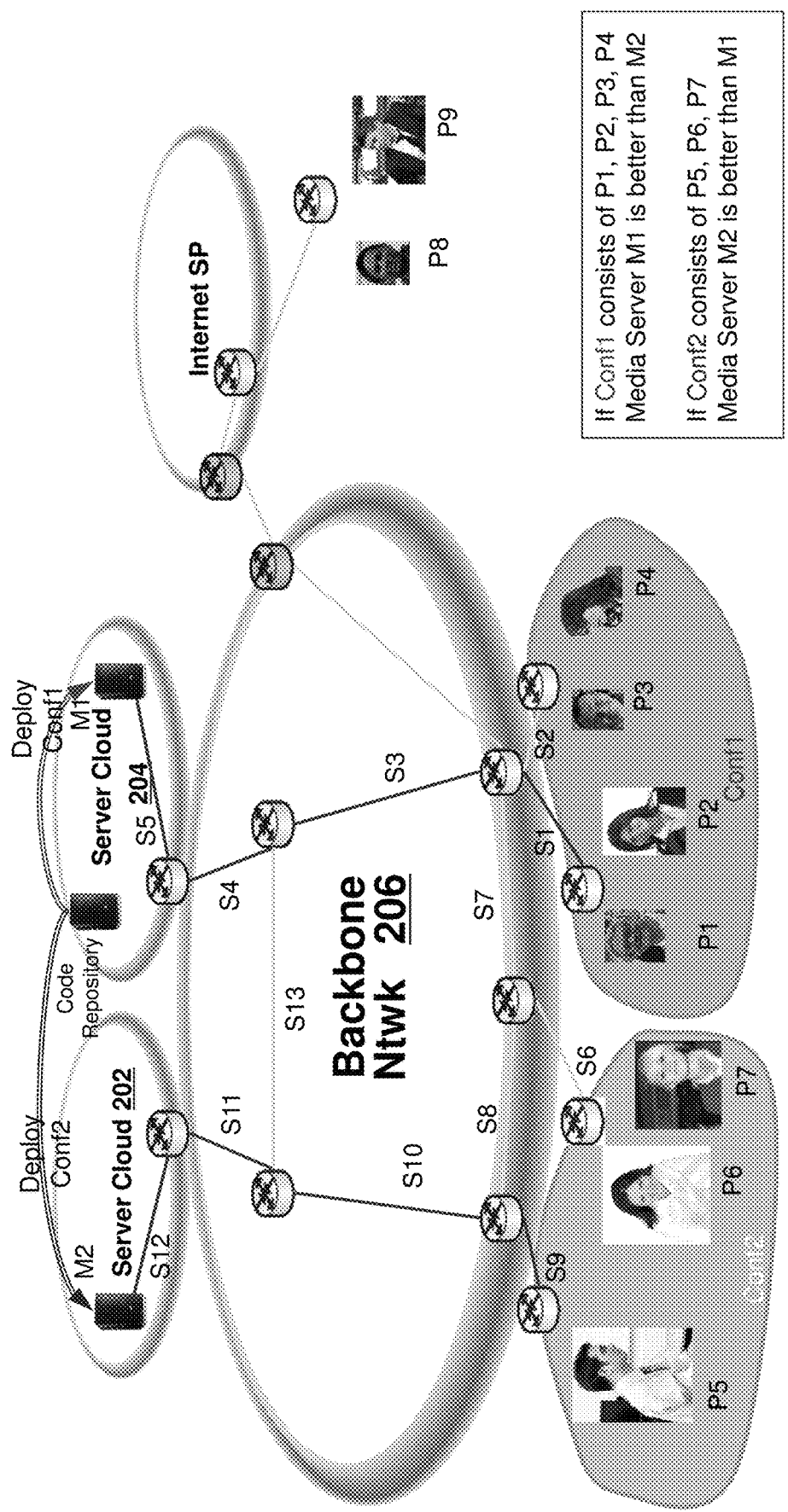
Figure 2C:
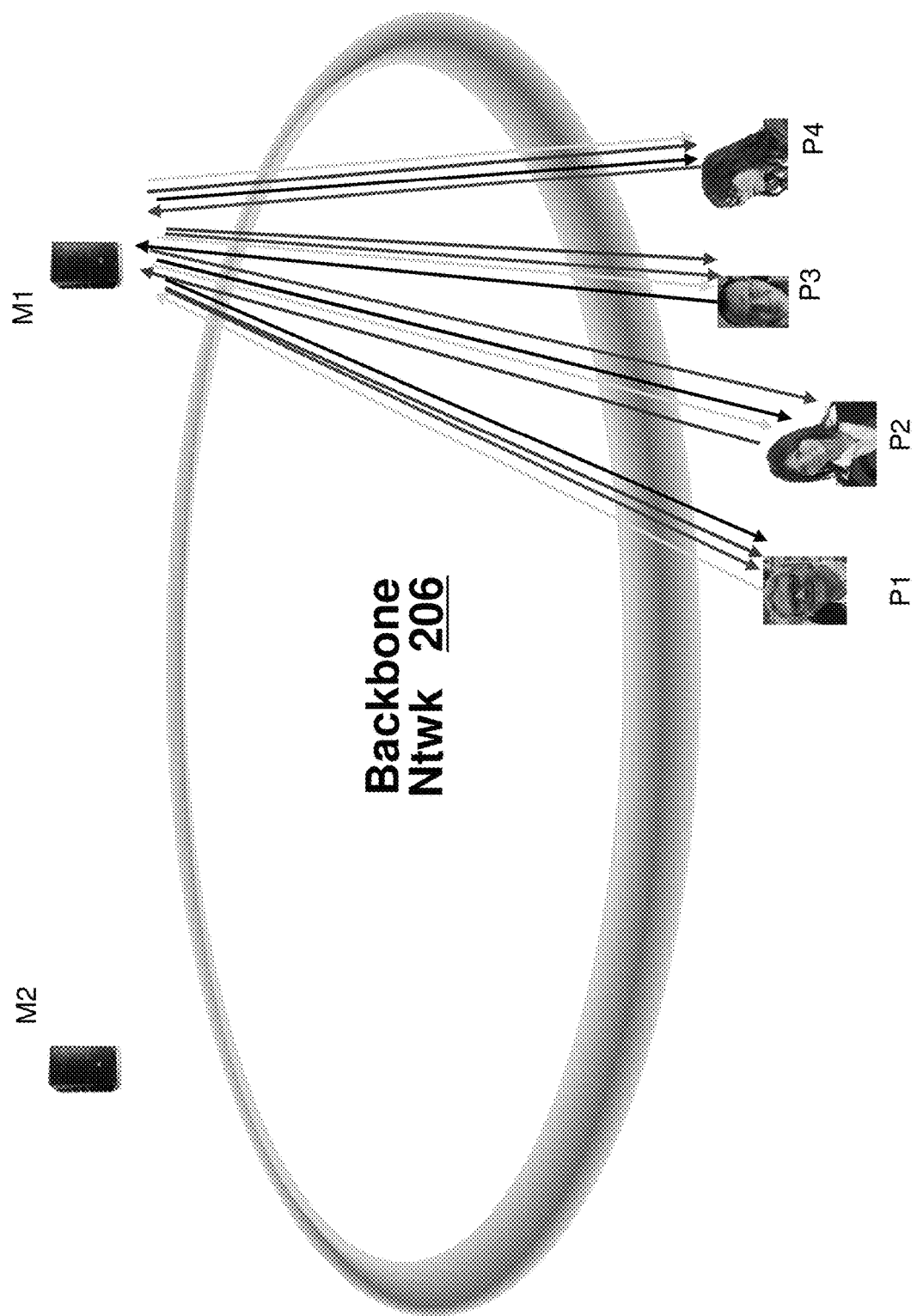
Figure 2D:
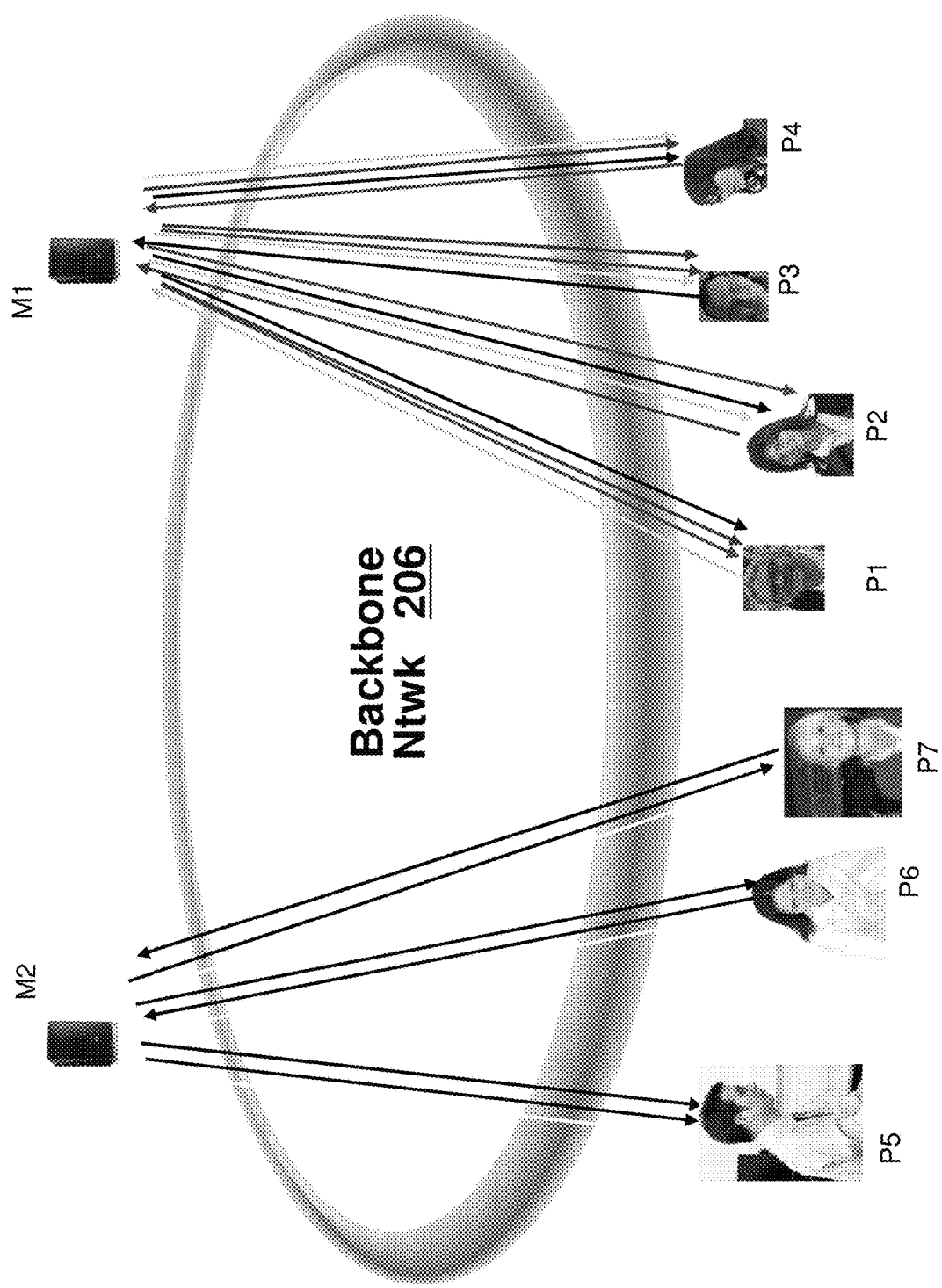
Figure 2E:
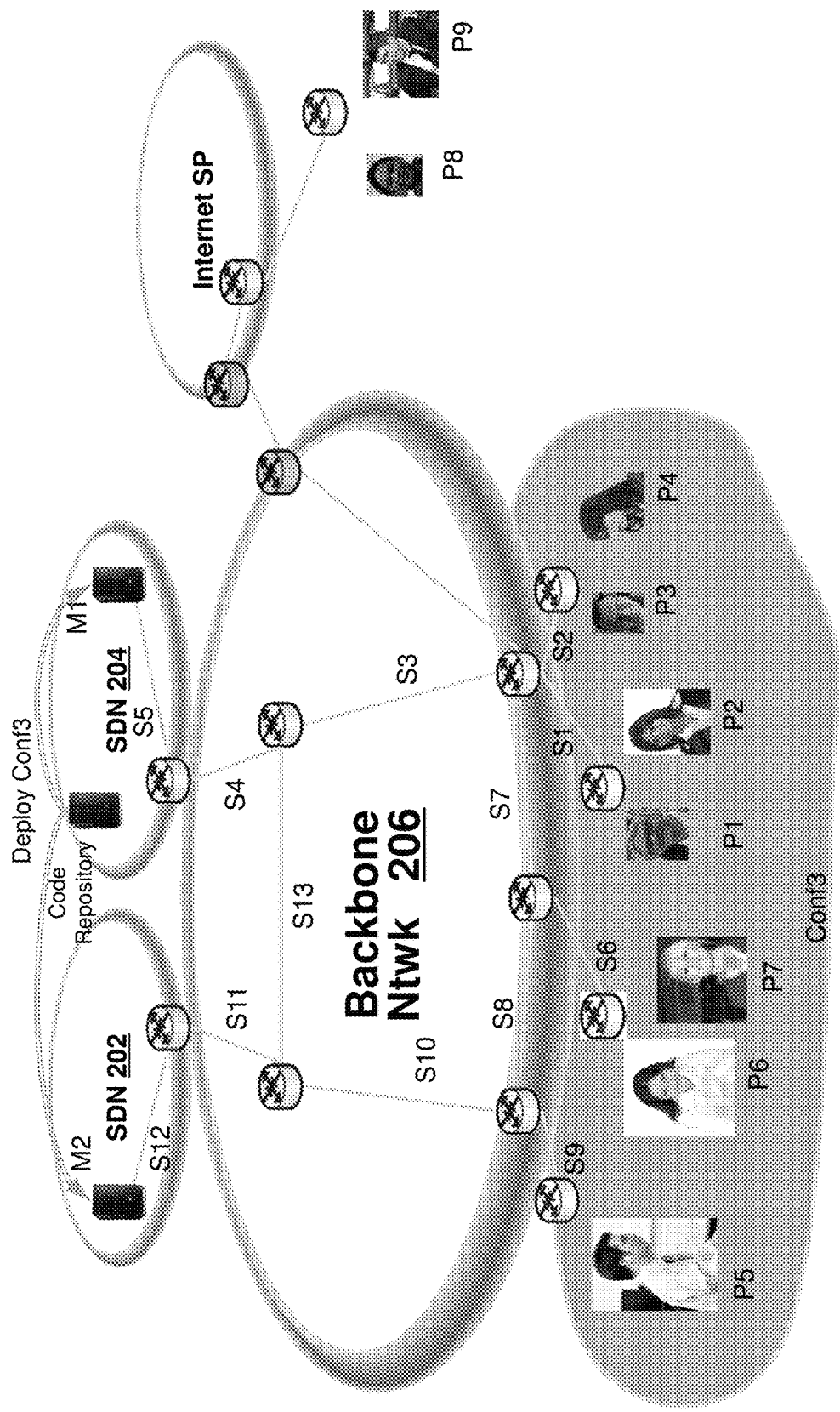
Figure 2F:
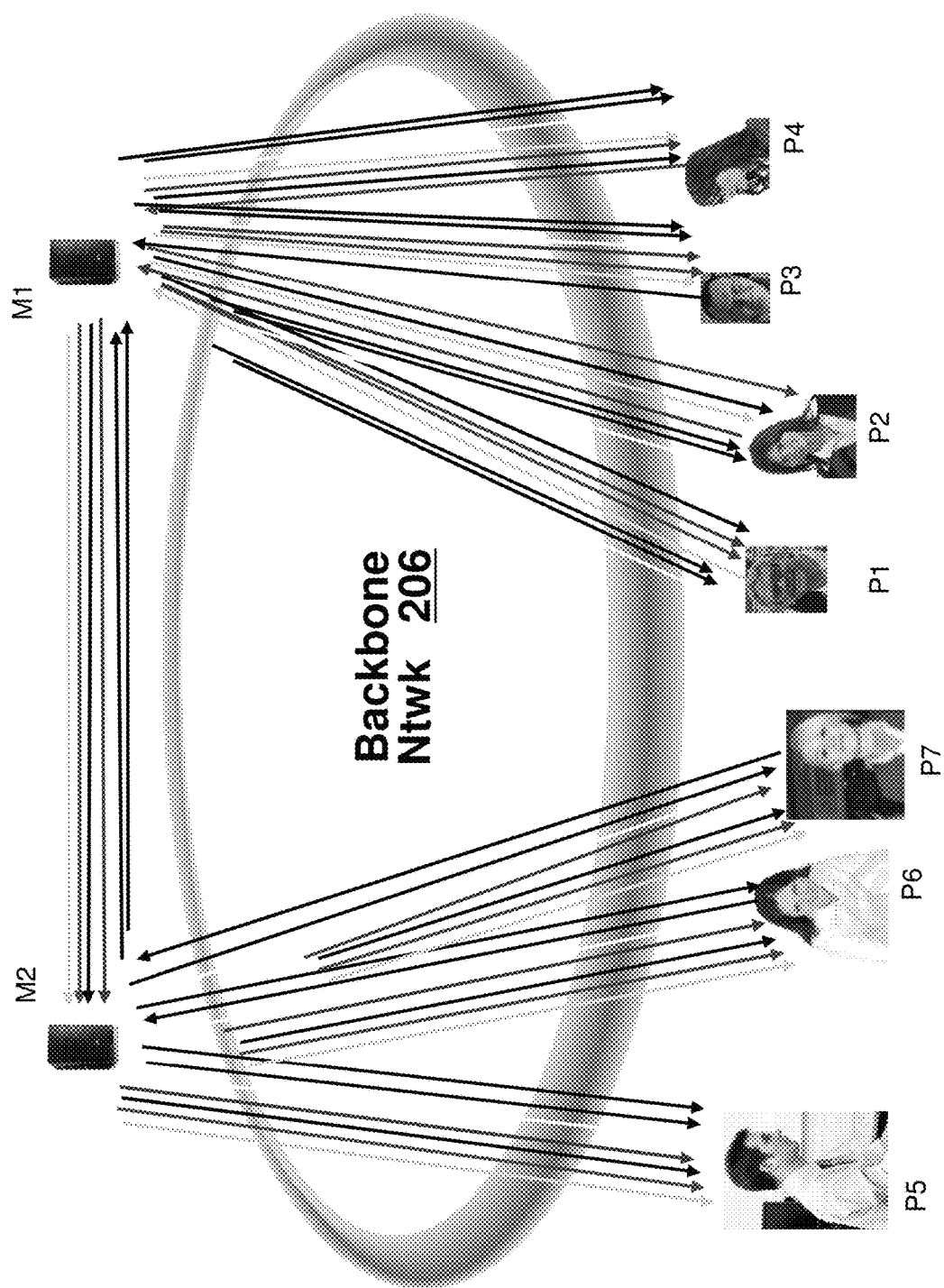

FIG. 2B depicts two teleconference scenarios (Conf 1 and Conf 2). For teleconference scenario Conf 1, whereby the participants P1-P4 are participating in a teleconference amongst each other, the service launch controller 102 can launch virtual media server M1 to provide teleconference services to the client devices of participants P1-P4 rather than launch the virtual media server M2, which would incur greater router/switch hops. FIG. 2C depicts the results of teleconference Conf 1. Similarly, for Conf 2, whereby the participants P5-P7 are participating in a teleconference amongst each other, the service launch controller 102 can launch virtual media server M2 to provide teleconference services to the client devices of participants P5-P7 rather than launch virtual media server M1, which would incur greater router/switch hops. FIG. 2D depicts the results of teleconference Conf 2. If a teleconference were to occur between all participants (P1-P7), as depicted in FIG. 2E, the service launch controller 102 can be configured to facilitate initiation of a trunk connection between the virtual media servers M1 and M2 as described previously in FIGS. 1B-1C. FIG. 2F depicts the results of teleconference Conf 3.

Figure 3:
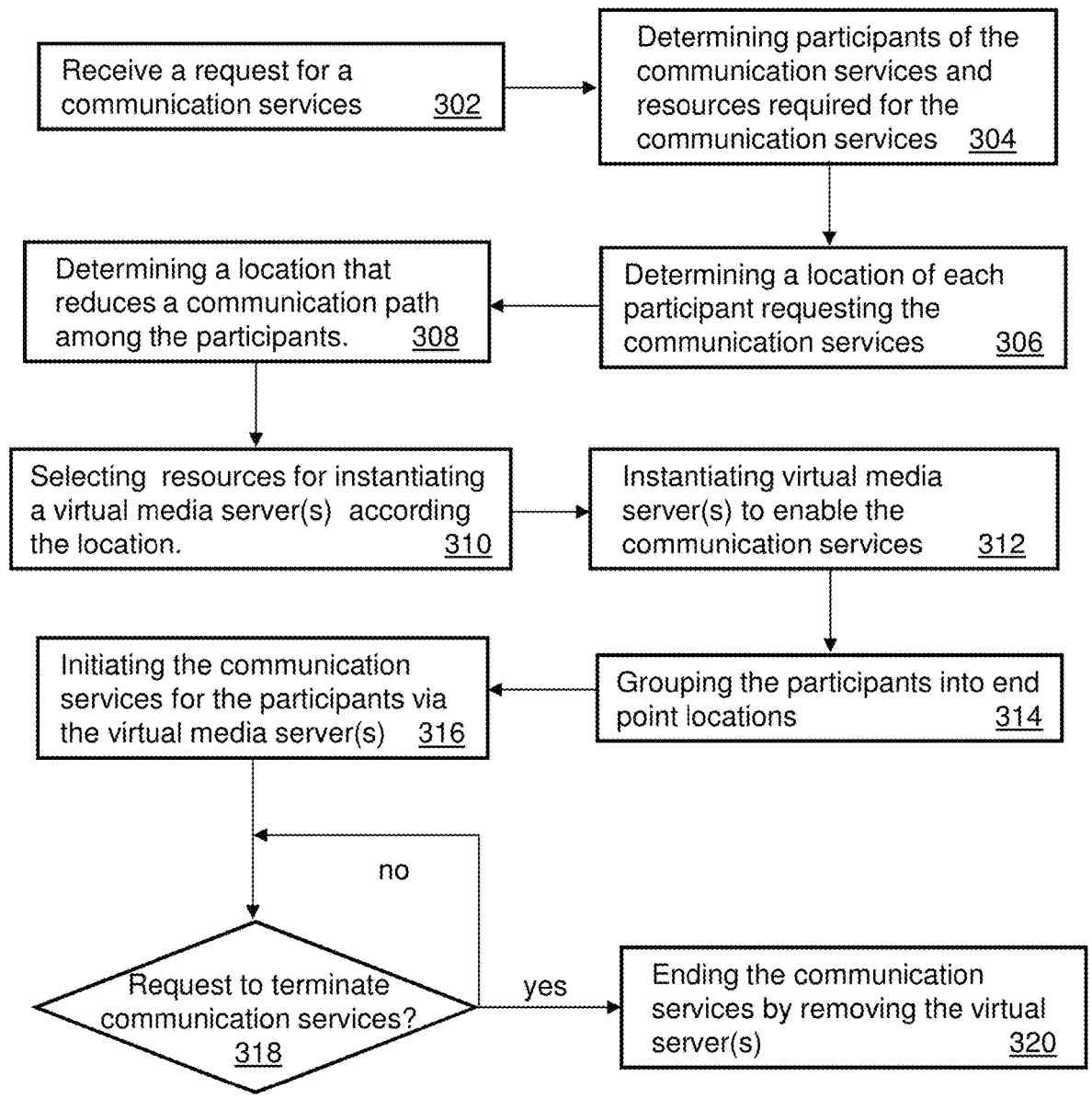
FIG. 3 depicts an illustrative embodiment of a method used in portions of the system described in FIGS. 1A-1C and 2A-2F.

FIG. 3 depicts an illustrative embodiment of a method 300 that can be used in portions of the systems described in FIGS. 1A-1C and 2A-2F. Method 300 can begin with step 302 in which a service launch controller 102 receives a request for communication services from one or more client devices. The communication services can include, without limitation, a request for a video conference, a request for media content (e.g., streaming video/audio content), or a request for a voice-only communication session. Other forms of a communications requests are contemplated by the subject disclosure. As described earlier, a client request can include instructions descriptive of the services being requested. At step 304, the service launch controller 102 can identify the participants making the request, and the resources required from a server cloud (such as those shown in FIGS. 1 and 2) for facilitating the communication services.

At step 306, the service launch controller 102 can further determine the location of the participants by sending pinging messages, or obtaining location data by other means. Once the location of the client devices of the requesting participants has been obtained, the service launch controller 102 can determine at step 308 a location of resources in the server cloud that reduces a communication path among the participants and prospective virtual media server(s). Once these resources have been located, the service launch controller 102 can select the resources at step 310 and instantiate at step 312 one or more virtual media servers to provide the requested communication services requested according to embodiments of the subject disclosure. From delay calculations similar to those described above, the service launch controller 102 can group at step 314 client devices of participants into end point locations based on their geographic location. At step 316, the service launch controller 102 can direct the virtual media server(s) to initiate the communication services. When the service launch controller 102 receives at step 318 a request to terminate the communication services, the service launch controller 102 can proceed to step 320 and tear down the virtual media server(s) to free up resources of the server cloud.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
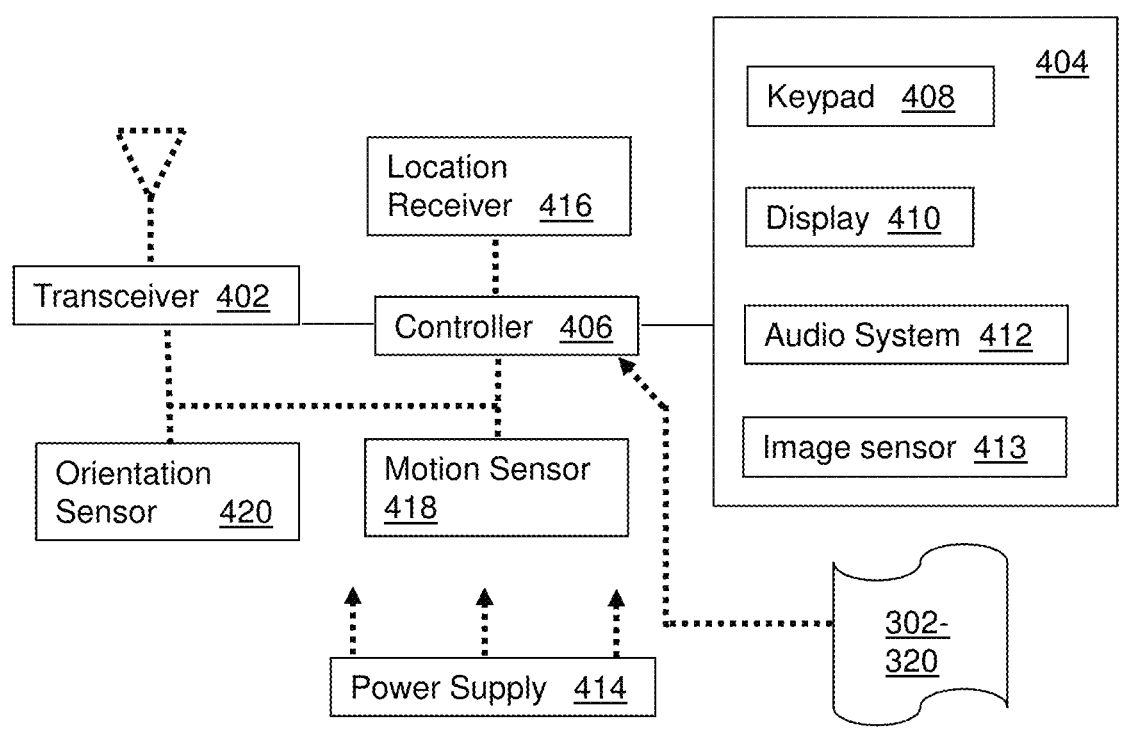
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1A-1C and 2A-2F and can be configured to perform in whole or in part the steps of method 300 of FIG. 3.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as VOIP, TCP/IP, UDP, MPLS, Ethernet, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of any of the devices depicted in FIGS. 1A-1C and 2A-2F, including but not limited to the service launch controller, the selective forwarding units, the client devices, routers, switches, and so on. In one embodiment, for example, communication device 400 can be adapted to perform all or a portion of the steps of method 300 of FIG. 3.

Upon reviewing the aforementioned embodiments, it would be evident to an artisan with ordinary skill in the art that said embodiments can be modified, reduced, or enhanced without departing from the scope of the claims described below. For example, service launch controller 102 can be adapted to determine delays of participant client devices according to other network parameters such as network load issues, protocols being employed by the network elements, and other parameters that can affect communication efficiencies. In another embodiment, the service launch controller 102 can be adapted to perform billing services to track fees incurred by client devices requesting services. In other embodiments the service launch controller 102 can be adapted to reorder end points in a network and reorganize trunks as client devices individually request services or terminate services. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
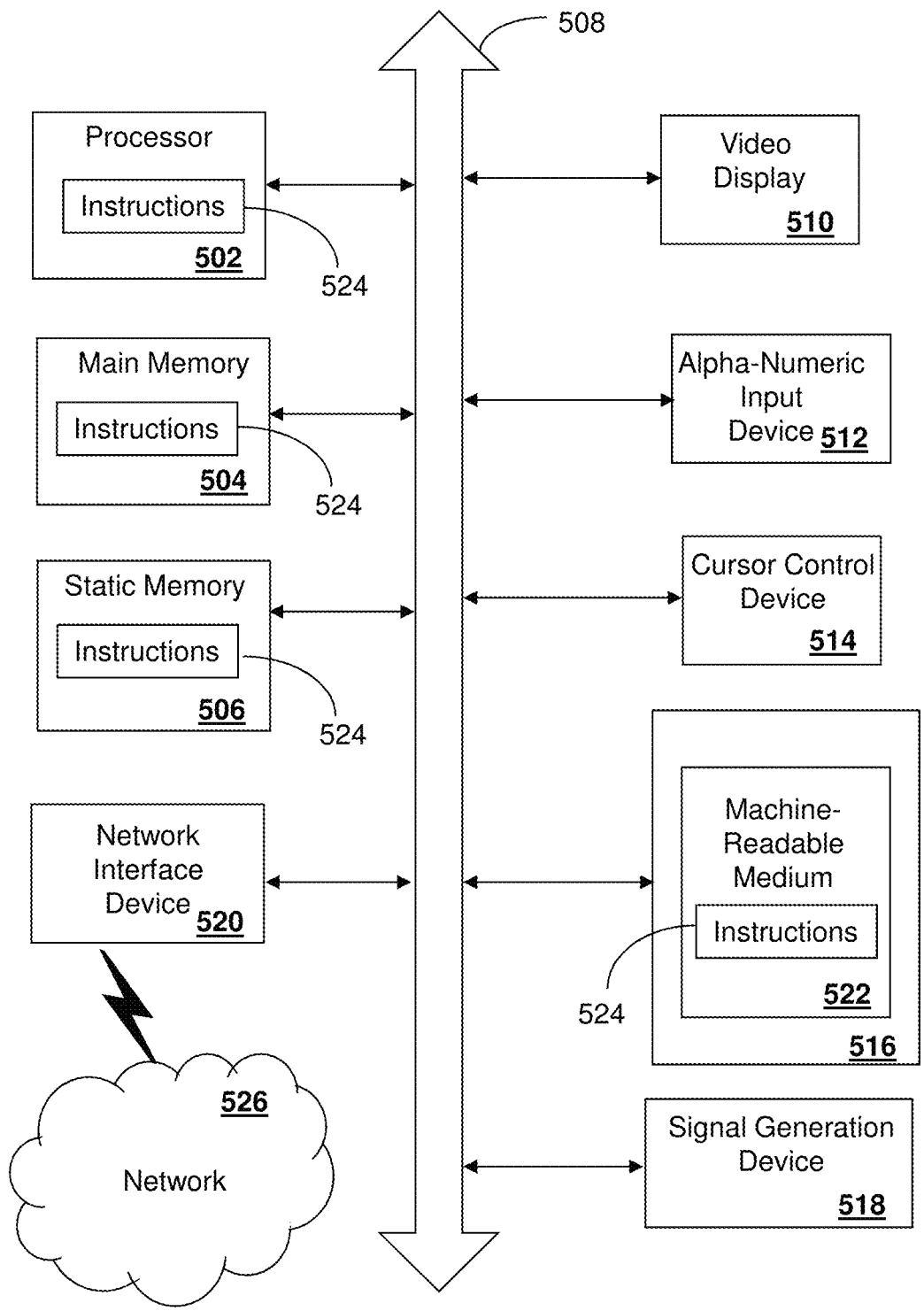
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the service launch controller, the selective forwarding units, the client devices, the routers, the switches and other devices of FIGS. 1A-1C and 2A-2F. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment. In addition, the computer system can be employed in the end devices of clients 106 in FIG. 1 or network 250 of FIG. 2.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a processing system comprising a processor, a request for a communication session;
determining, by the processing system, participants of the communication session;
determining, by the processing system, a location of each participant of the communication session as a plurality of participant locations, wherein equipment of all the participants of the communication session are interconnected via a backbone communications network;
selecting, by the processing system, a first resource location and a second resource location of a server cloud to obtain first and second selected resource locations;
determining, by the processing system, a plurality of communication path delays for communications between the equipment of all of the participants of the communication session and each of the first and second selected resource locations;
grouping, by the processing system, the participants of the communication session into a first portion of the participants associated with the first selected resource location and a second portion of the participants associated with the second selected resource location, wherein the grouping of the first and second portions of the participants is based on minimum communication path delays of the plurality of communication path delays between the participants and each of the first and second selected resource locations;
instantiating, by the processing system, a first virtual media server at the first selected resource location, at a start time of the communication session;
instantiating, by the processing system, a second virtual media server at a second selected resource location, wherein equipment of the first portion of the participants is served by the first virtual media server and equipment of the second portion of the participants is served by the second virtual media server;
establishing, by the processing system, a dedicated real-time transport protocol (RTP) trunk between the first virtual media server and the second virtual media server, a first end of the dedicated RTP trunk at the first resource location and a second end of the dedicated RTP trunk at the second resource location; and
instructing, by the processing system, the first and second virtual media servers to relay communication session data between the first portion of the participants and the second portion of the participants via the dedicated RTP trunk.

2. The method of claim 1, wherein the communication session is a multipoint video conference, wherein the communication session comprises a teleconference service, wherein the dedicated RTP trunk is a one-time RTP trunk, established while the teleconference service is active, and wherein the dedicated, one-time RTP trunk is torn down when the teleconference service is terminated by equipment at a location of the participant locations.

3. The method of claim 2, wherein the selecting of the first and second selected resource locations is according to a type of communication session, capabilities associated with equipment at each of the first and second selected resource locations, and workloads associated with the equipment at each of the first and second selected resource locations.

4. The method of claim 1, further comprising determining, by the processing system, characteristics associated with the participants, wherein the grouping of the first and second portions of the participants of the communication session into the first and second portions is according to the characteristics.

5. The method of claim 4, wherein the characteristics comprise languages utilized by the participants.

6. The method of claim 1, further comprising:
wherein the second selected resource location is selected according to another one of the first and second selected resource locations that further reduces a communication path delay among end points, wherein the instantiating of the second virtual media server at the second selected resource location, occurs at the start time of the communication session, and wherein the first selected resource location is served by the first virtual media server and the second selected resource location is served by the second virtual media server initiating, by the processing system, a trunk connection between the first virtual media server and the second virtual media server.

7. The method of claim 1, further comprising:
instantiating, by the processing system, other virtual media servers for other resource locations, wherein the other virtual media servers are selected based on other locations where other groups of participants are clustered.

8. The method of claim 1, further comprising pinging, by the processing system, communication devices of the participants to obtain the communication path delays,
wherein the selecting of the first and second selected resource locations is based on determining ping delays for the communication devices to obtain a least number of router and/or switch hops between the equipment of all the participants.

9. The method of claim 1, further comprising determining, by the processing system, a number of hops between network elements for communication devices of the participants,
wherein the selecting of the first and second selected resource locations is based on the number of hops.

10. An apparatus, comprising:
a processing system including a processor; and
a memory that stores executable instructions that, when executed by the processing system, facilitate performance of operations, the operations comprising:
determining a plurality of locations for participants of a communication session wherein equipment of all the participants of the communication session are interconnected via a backbone communications network;
determining a first and a second resource locations of a server cloud to obtain first and second selected resource locations from among a group of resource locations;
determining a plurality of communication path delays for communications between the equipment of all of the participants of the communication session and each of the first and second selected resource locations;
grouping the participants of the communication session into a first portion of the participants associated with the first selected resource location and a second portion of the participants associated with the second selected resource location, wherein the grouping of the first and second portions of the participants is based on minimum communication path delays of the plurality of communication path delays between the participants and each of the first and second selected resource locations;
instantiating a first virtual media server at the first selected resource location, at a beginning of the communication session;
instantiating a second virtual media server at the second selected resource location, wherein a first group of end points is served by the first virtual media server and a second group of end points is served by the second virtual media server;
establishing a dedicated real-time transport protocol (RTP) trunk between the first virtual media server and the second virtual media server, a first end of the dedicated RTP trunk at the first resource location and a second end of the dedicated RTP trunk at the second resource location;
instructing the first and second virtual media servers to relay communication session data between the first and second portions of the participants during the communication session via the dedicated RTP trunk; and
terminating the dedicated RTP trunk at an end of the communication session.

11. The apparatus of claim 10, wherein the communication session is a multipoint video conference, and wherein the determining of the first and second resource locations are based upon a quality of service to support the communication session.

12. The apparatus of claim 11, wherein the determining of the first and second selected resource locations is determined according to one of a type of communication session, capabilities associated with available resources at each of the group of resource locations, or workloads associated with the available resources at each of the group of resource locations.

13. The apparatus of claim 10, wherein the operations further comprise:
determining characteristics associated with the participants, wherein the grouping of the first and second portions of the participants of the communication session is determined according to the characteristics.

14. The apparatus of claim 13, wherein the characteristics further comprise languages utilized by the participants.

15. The apparatus of claim 10, wherein the operations further comprise:
selecting other resource locations from among the group of resource locations as other selected resource locations according to an associations between the other selected resource locations and the first and second selected resource locations to reduce a communication path delay among the first and second selected resource locations and the other selected resource locations; and
instantiating other virtual media servers at the other selected resource locations for the first and second groups of end points,
wherein the other virtual media servers are selected based on locations where groups of participants are clustered.

16. The apparatus of claim 15, wherein the operations further comprise:
relaying the communication session data between the other virtual media servers via a virtual media server.

17. The apparatus of claim 10, wherein the operations further comprise:
pinging communication devices of the participants, wherein the grouping of the first and second portions of the participants is based on determining ping delays for the communication devices.

18. A non-transitory, machine-readable storage medium, comprising executable instructions that, when executed by a processing system including a processor, facilitate performance of operations, the operations comprising:

determining a plurality of locations for participants of a communication session wherein equipment of all the participants of the communication session are interconnected via a backbone communications network;

determining a first and a second resource locations of a server cloud to obtain first and second selected resource locations from among a group of resource locations;

determining a plurality of communication path delays for communications between equipment of all of the participants of the communication session and each of the first and second selected resource locations;

grouping the participants of the communication session into a first portion of the participants associated with the first selected resource location and a second portion of the participants associated with the second selected resource location based on a minimum communication path delay of the plurality of communication path delays, wherein the grouping of the first and second portions of the participants is based on minimum communication path delays of the plurality of communication path delays between the participants and each of the first and second selected resource locations;

instantiating a first virtual media server at the first selected resource location, at a start event of the communication session;

instantiating a second virtual media server at the second selected resource location, wherein the first selected resource location is served by the first virtual media server and the second selected resource location is served by the second virtual media server;

establishing a dedicated real-time transport protocol (RTP) trunk between the first virtual media server and the second virtual media server, a first end of the dedicated RTP trunk at the first resource location and a second end of the dedicated RTP trunk at the second resource location; and instructing the first virtual media server to relay communication session data between the first and second virtual media servers, wherein the communication session data between the first and second selected resource locations is exchanged between the dedicated RTP trunk.

19. The non-transitory, machine-readable storage medium of claim 18, wherein the operations further comprise:

determining characteristics associated with the participants, wherein the grouping of the participants of the communication session into the first and second selected resource locations is according to the characteristics.

20. The non-transitory, machine-readable storage medium of claim 18, wherein the operations further comprise:

instantiating other virtual media servers at other resource locations, wherein the other virtual media servers are selected based on other locations where other groups of participants are clustered.

* * * * *

UNITED STATES PATENT AND TRADEMARK OFFICE
CERTIFICATE OF CORRECTION

PATENT NO. : 11,637,873 B2
APPLICATION NO. : 14/621514
DATED : April 25, 2023
INVENTOR(S) : Reuben Klein and Richard Lynn Bennett It is certified that error appears in the above-identified patent and that said Letters Patent is hereby corrected as shown below:

In the Claims

Claim 6: Column 13, Lines 18-20, delete "initiating, by the processing system, a trunk connection between the first virtual media server and the second virtual media server"

Signed and Sealed this
Sixth Day of June, 2023

Katherine Kelly Vidal
*Director of the United States Patent and Trademark Office*